United States Patent [19]

Schotthoefer

[11] Patent Number: 5,062,665
[45] Date of Patent: Nov. 5, 1991

[54] DOOR EDGE GUARD WITH J CROSS SECTION

[75] Inventor: Gerald R. Schotthoefer, Dallas, Tex.
[73] Assignee: Adell Corporation, Sunnyvale, Tex.
[21] Appl. No.: 536,422
[22] Filed: Jun. 11, 1990
[51] Int. Cl.$^5$ ............................................. B60R 27/00
[52] U.S. Cl. ....................................... 280/770; 49/462
[58] Field of Search ........................... 49/462; 52/716; 280/770, 762

[56] References Cited

U.S. PATENT DOCUMENTS

| | | | |
|---|---|---|---|
| 3,494,075 | 2/1970 | Kunevicius | 49/462 |
| 3,550,951 | 12/1970 | Cobbs | 49/462 X |
| 4,581,807 | 4/1986 | Adell | 49/462 X |
| 4,587,762 | 5/1986 | Adell | 49/462 |
| 4,817,335 | 4/1989 | Adell | 52/716 X |

Primary Examiner—Andres Kashnikow
Assistant Examiner—Michael Mar
Attorney, Agent, or Firm—Timmons & Kelly

[57] ABSTRACT

A door edge guard having a metal body having a straight portion and a curved portion. The metal body is completely surrounded by a plastic insulating cover. The body and the cover are secured to the trailing edge of an automobile door with an adhesive, such as a piece of double sided tape. The curved portion of the body has two radii of curvature, wherein the first radius of curvature is larger than the second. The center of the first radius of curvature is offset from the center of the second radius of curvature.

1 Claim, 1 Drawing Sheet

DOOR EDGE GUARD WITH J CROSS SECTION

BACKGROUND OF THE INVENTION

1. Field of the Invention

This invention relates in general to door edge guards mounted on the trailing edges of automobile doors. In particular, the invention relates to insulated metal door edge guards.

2. Description of the Prior Art

Door edge guards are mounted on the trailing edges of automobile doors to protect the edges of the doors and to protect objects that are struck by the door edge. For example, in a crowded parking lot the door edge may strike the side of an adjacent automobile. Without door edge guards, the door edges may be chipped and subsequently rust.

Metal door edge guards are generally made of stainless steel or aluminum. If the metal of the guard is different from the metal of the door, usually carbon steel, then the two metals must be insulated to prevent electrochemical action between the two metal from causing galvanic corrosion. Insulating materials are generally plastics, such as polyvinylchloride (PVC).

In some cases, the door edge guard wraps around the edge of the door and is held in place by the friction between the door edge guard and the door edge. In other cases, a strip of double sided tape may be used to hold the guard in place.

SUMMARY OF THE INVENTION

The door edge guard of the invention has a stainless steel body completely surrounded by a polyvinylchloride insulating cover. The body has a straight portion and a curved portion. The curved portion of the body has two radii of curvature.

The first radius of curvature is larger than the second and is between the straight portion of the body and the second radius of curvature. Thus, the second radius of curvature corresponds to the radius of curvature of the trailing edge of the door to aid in securing the door edge guard to the door.

An adhesive, such as a piece of double sided tape, is located between the straight portion of the body and the door. The adhesive and the curved portion of the body secure the door edge guard to the door.

DESCRIPTION OF THE PREFERRED EMBODIMENT

Figure 1:
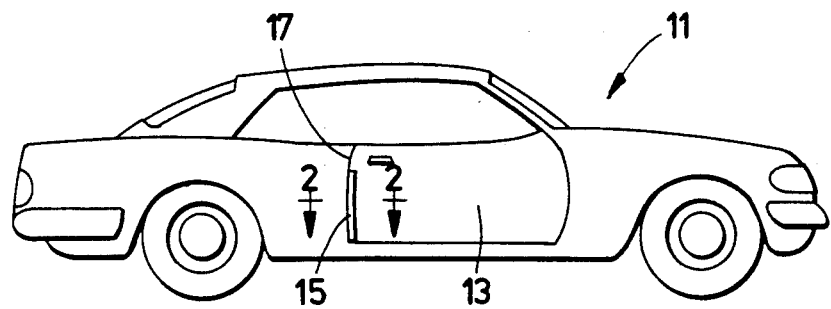
FIG. 1 is a side view of an automobile including the preferred embodiment of the invention

FIG. 1 shows a typical automobile 11, having a standard door 13. A door edge guard 15 is mounted on the trailing edge 17 of the door 13. The door edge guard 15 is shown in greater detail in FIG. 2.

Figure 2:
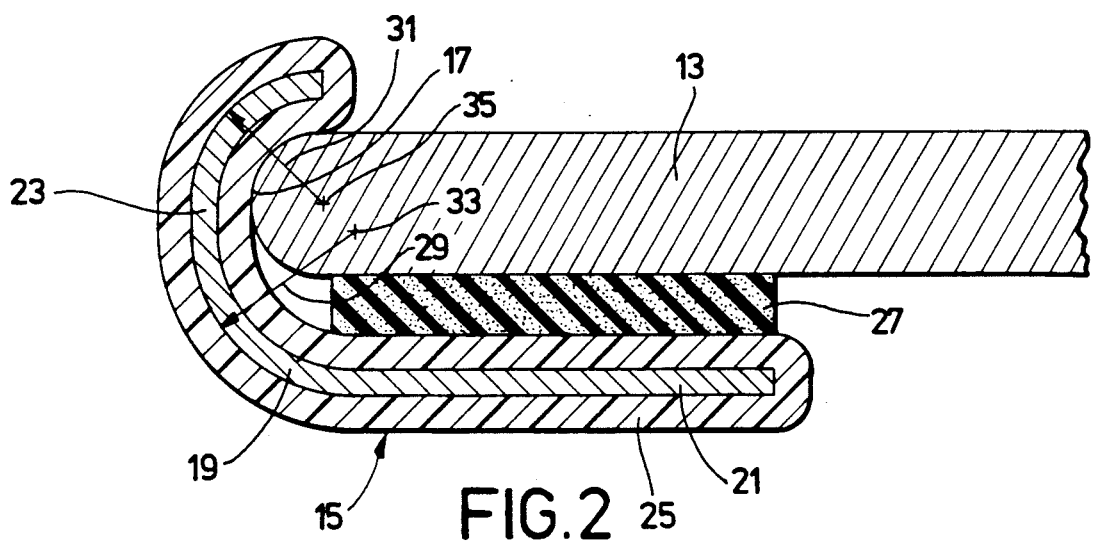
FIG. 2 is a sectional view of the door edge guard of the invention, as seen along lines 2—2 in FIG. 1.

As shown in FIG. 2, the door edge guard 15 is mounted on the trailing edge 17 of the door 13. The guard 15 has a metal body 19, which has a straight portion 21 and a curved portion 23. The metal of the body 19 is preferably stainless steel, but it may also be aluminum or some other metal.

The metal of the automobile door 13 is generally carbon steel. Since the door 13 and the body 19 of the door edge guard 15 are made of different metals, it is preferable that the two metals be insulated. Therefore, the metal body 19 of the guard 15 is completely surrounded by a plastic insulating cover 25. The plastic cover 25 is preferably made of polyvinylchloride (PVC).

An adhesive, such as a piece of double sided tape 27, is located between the door 13 and the straight portion 21 of the body 19 for securing the body 19 to the door 13. Additionally, the curved portion 23 of the body 19 and the insulating cover 25 wrap around the trailing edge 17 of the door 13 to further aid is securing the door edge guard 15 to the door 13.

The curved portion 23 of the body 19 has two different radii of curvature, a first radius 29 and a second radius 31. The first radius of curvature 29 is located between the straight portion 21 of the body 19 and the second radius of curvature 31. The center 33 of the first radius of curvature 29 is offset from the center 35 of the second radius of curvature 31.

The second radius of curvature 31 corresponds to the radius of curvature of the edge 17 of the door 13. The first radius of curvature 29 is larger than the second radius of curvature 31, because the first radius 29 spans the distance between the trailing edge 17 of the door 13 and the outer surface of the adhesive 27.

The door edge guard 15 of the invention has several advantages over the prior art. The guard 15 of the invention is easy to manufacture and to install. Also, the curved portion 23 of the body 19 wraps around the trailing edge 17 of the door 13 to aid in securing the guard 15 to the door 13. The second radius of curvature 31 causes the curved portion 23 of the body 19 to fit closely against the trailing edge 17 of the door 13.

The invention has been shown in only one embodiment. It should be apparent to those skilled in the art that the invention is not so limited, but is susceptible to various changes and modifications without departing from the spirit of the invention.

I claim:

1. A door edge guard for protecting the trailing edge of an automobile door, the trailing edge being curved and having a specific radius of curvature, comprising:
    a body having a straight portion parallel to an outer surface of the automobile door, and a curved portion extending from the straight portion around the trailing edge of the door, the curved portion having an outer surface with a first radius of curvature and a second radius of curvature, wherein the first and second radii have different centers, wherein the first radius of curvature is located between the straight portion of the body and the second radius of curvature, and the first radius of curvature is larger than the second radius of curvature;
    a piece of double sided adhesive tape of predetermined thickness located between the outer surface of the door and the straight portion of the body for securing the body to the door; and
    an insulating cover completely surrounding the body to prevent contact between the body and the door wherein the outer surface of the portion of the insulating cover located adjacent an inner surface of the second radius of curvature of said curved portion has a radius of curvature which corresponds to the radius of curvature of the trailing edge of the door for engagement therewith.

* * * * *